No. 861,105. PATENTED JULY 23, 1907.
H. E. GENOR.
JIG OR FORM FOR COMMUTATOR ASSEMBLING.
APPLICATION FILED FEB. 20, 1906.
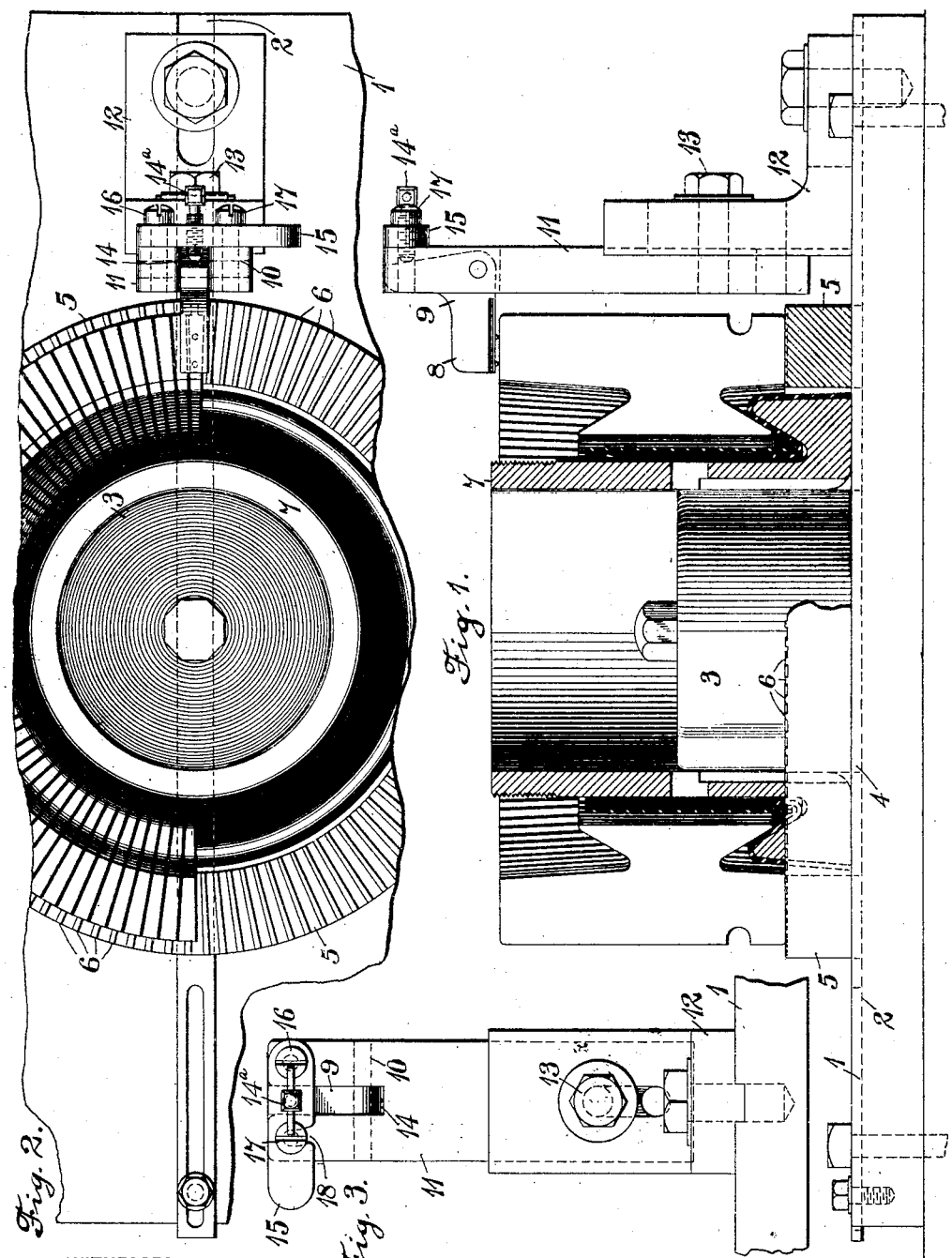
WITNESSES:
Fred H. Miller
R. J. Dearborn
INVENTOR
Henry E. Genor
BY
Wesley G. Carr
ATTORNEY though subject to the above mentioned impressed downward pressure and heavy radial pressure, cannot but be accurately formed.

UNITED STATES PATENT OFFICE.

HENRY E. GENOR, OF WILKINSBURG, PENNSYLVANIA, ASSIGNOR TO WESTINGHOUSE ELECTRIC & MANUFACTURING COMPANY, A CORPORATION OF PENNSYLVANIA.

JIG OR FORM FOR COMMUTATOR ASSEMBLING.

No. 861,105.

Specification of Letters Patent.

Patented July 23, 1907.

Application filed February 20, 1906. Serial No. 302,136.

*To all whom it may concern:*

Be it known that I, HENRY E. GENOR, a citizen of the United States, and a resident of Wilkinsburg, in the county of Allegheny and State of Pennsylvania, have invented a new and useful Improvement in Jigs or Forms for Commutator Assembling, of which the following is a specification.

My invention relates to jigs, forms or similar devices upon which commutator segments for dynamo-electric machines may be assembled and it has for its object to provide a device of the aforesaid class, which shall be simple and durable in construction and which shall materially facilitate the assembling of the commutator segments and obviate the necessity of subsequently machining the interior surface of the commutator cylinder.

Commutator cylinders for dynamo-electric machines, which comprise a plurality of similar bars or segments separated by strips or layers of suitable insulating material, have usually been constructed by assembling the bars within a ring-shaped clamp by means of which the assembled bars were held in position while the inner cylindrical surface and the usual V-shaped grooves therein were being machined. After the machining process, the commutator bars were fitted upon an internal bushing and held in position by V-shaped rings which engaged the complementary grooves therein.

Commutator bars of moderate thickness may be so formed by the punching process, as now perfected, that a commutator cylinder composed of such bars may be utilized without machining its inner surface, provided the several bars can be held in the same relative position to the bushing during the assembling process. If the bars are assembled directly upon the bushing, it is necessary to force the last bar of the set into position, and, consequently, the commutator is liable to run untrue when the bushing is mounted upon a rotating shaft.

According to my present invention, I provide a ring of somewhat larger radius than the V-shaped flange on the bushing, upon which the several bars may rest until the required number are set up around the bushing when the bars are drawn together and into position on the bushing by means of the usual V-shaped ring.

My invention is illustrated in the accompanying drawings in which

Figure 1 is a view, partially in side elevation and partially in section and Fig. 2 is a plan view of a jig constructed in accordance therewith. Fig. 3 is a detail view of the clamping device shown in Figs. 1 and 2.

Referring to the drawings, the jig illustrated therein comprises a base plate 1 which is provided with a centrally located, longitudinal slot 2, a detachable, cylindrical member 3, the lower end of which is provided with a projecting key 4 which is adapted to engage the slot 2, a ring 5, the upper surface of which is provided with a plurality of radial projections 6, corresponding in number to the commutator bars to be assembled, and which is mounted upon the base plate 1 concentric with the cylindrical member 3. The cylindrical member 3 is of such size as to correspond to the shaft upon which the commutator bushing will be mounted so that the commutator bushing 7 may be fitted closely thereto. The ring 5 is of sufficient size to avoid the bushing 7 which may rest upon the base plate 1.

In assembling a commutator after the bushing 7 is in position on the base plate 1, a single commutator bar is first held in an upright position, with its lower end resting upon one of the projections 6 on the upper surface of the ring 5, by means of the arm 8 of an angle piece 9 which is pivotally supported upon a pin 10 in the upper end of a vertically adjustable upright member 11, that is attached to an angle block 12 by a binding screw 13. The angle piece 9 is so mounted upon the pin 10 in a slot 14 in the upper extremity of the upright member 11, that a downward pressure may be applied to a commutator bar located beneath the arm 8 by means of a set screw 14ª, that is screw-threaded into a latch bar 15. The bar 15 is pivotally mounted upon a screw 16 and may be fastened in position across the slot 14 by it and by a screw 17 with which it engages by means of a notch 18.

The radial projections 6 on the upper surface of the ring 5 form a plurality of intervening radial grooves or recesses, and strips of insulating material of suitable shape, that are assembled between adjacent commutator bars, extend into the recesses so formed. In this way, the insulating material extends somewhat beyond the commutator bars so that complete insulation of the adjacent bars is insured.

In using the apparatus above described, a single commutator bar is accurately adjusted upon the ring 5 beneath the arm 8 and is then clamped in position by manipulating the screw 14ª. The additional bars and the alternate insulating strips are then placed in position around the bushing until the cylinder is completed.

Since the inner diameter of the ring 5 is considerably greater than the outside diameter of the bushing 7 and since its height is such as to prevent the bars from moving into close engagement with the V-shaped flange on the bushing, all the bars may be assembled without crowding, after which a V-shaped ring may be forced into engagement with the upper annular groove in the cylinder, and, as this ring is forced down, the bars will be drawn radially inward and the bushing 7 will be drawn up until its V-shaped flange fits closely into the lower annular groove in the cylinder and the cylinder is clamped securely upon the bushing with its bars uniformly spaced and subjected to the same stresses.

I claim as my invention:

1. A jig for assembling commutator segments, comprising a base plate having a projection which is adapted to fit within a commutator bushing, a ring mounted concentrically therewith on said base and having a plurality of radial slots in its upper surface, and means for supporting a single bar in an upright position on the upper surface of the ring.

2. A jig or form for assembling commutator segments that comprises a cylindrical member which is adapted to engage the interior of a commutator bushing, a ring which is concentric with and of larger radius than the outer radius of the bushing and the upper surface of which is provided with radial projections corresponding to the number of commutator bars, and means for supporting a single bar in an upright position on one of said radial projections.

3. A jig or form for assembling commutator segments that comprises a plane base, means for fastening a commutator bushing with its axis perpendicular thereto, a ring of materially larger radius than the bushing and concentric therewith, and means for fastening a single bar on the upper surface of the ring in a radial plane.

4. A jig for assembling commutator segments that comprises a base plate having a projection which is adapted to fit the interior of a commutator bushing, a ring mounted concentrically therewith on said base and having a plurality of radial recesses in its upper surface, and means for supporting a single bar in an upright position on the upper surface of the ring that comprises an angle block, an adjustable upright attached thereto having a slot near its upper extremity, an angle piece which is pivotally mounted in said slot and one arm of which may project radially over said ring and means for causing said arm to exert a downward pressure.

5. A jig or form for assembling commutator segments that comprises a cylindrical member which is adapted to engage the interior of the commutator bushing, a ring which is concentric with, and of larger radius than the outer radius of the bushing and the upper surface of which is provided with radial projections corresponding in number to the commutator bars and means for supporting a single bar in an upright position on one of said radial projections that comprises an angle block, an adjustable upright attached thereto having a slot near its upper extremity, an angle piece which is pivotally mounted in said slot and one arm of which may project radially over said ring and means for causing said arm to exert a downward pressure.

6. A jig or form for assembling commutator segments that comprises a plane base, means for fastening a commutator bushing with its axis perpendicular thereto, a ring of materially larger radius than the bushing and concentric therewith, and means for fastening a single bar on the upper surface of the ring in a radial plane that comprises an angle block, an adjustable upright attached thereto having a slot near its upper extremity, an angle piece which is pivotally mounted in said slot and one arm of which may project radially over said ring and means for causing said arm to exert a downward pressure.

7. A jig or form for assembling commutator segments for dynamo-electric machines that comprises a plane base having a centrally located longitudinal slot, a detachable cylindrical member which is fitted inside a commutator bushing and has end projections which engage said slot, a ring member which is mounted on said base concentric with said cylindrical member and is provided with a plurality of radial projections on its upper surface corresponding in number to the commutator bars.

8. A jig or form for assembling commutator segments for dynamo-electric machines that comprises a plane base having a centrally located longitudinal slot, a detachable cylindrical member which is fitted inside a commutator bushing and has end projections which engage said slot, a ring member which is mounted on said base concentric with said cylindrical member and is provided with a plurality of radial projections on its upper surface corresponding in number to the commutator bars, an angle block, an adjustable upright member attached thereto having a slot near its upper extremity, an angle piece pivotally mounted in said slot and one arm of which may project radially over said ring and means for causing said arm to exert a downward pressure.

9. A jig or form for assembling commutator segments comprising a base having a projection to receive a commutator bushing, a ring of greater diameter than the bushing that surrounds it and rests upon the base, and adjustable means for holding a segment upon the ring.

10. A jig or form for assembling commutator segments comprising a base having a cylindrical projection and a ring between which is space for a bushing and means for clamping a segment in proper radial position on the ring.

11. A jig or form for assembling commutator segments comprising a base having a cylindrical member to receive a commutator bushing, a ring having radial ribs upon its upper surface and of such diameter that it may surround the bushing and rest upon the base, and means for clamping a single commutator segment against one of said radial ribs in operative relation to the bushing.

In testimony whereof, I have hereunto subscribed my name this 16th day of February, 1906.

HENRY E. GENOR.

Witnesses:
R. J. DEARBORN,
BIRNEY HINES.